United States Patent

Berstecher et al.

[11] Patent Number: 5,988,848
[45] Date of Patent: Nov. 23, 1999

[54] METHOD AND ARRANGEMENT FOR ADAPTING A SLIDING MODE FUZZY CONTROLLER

[75] Inventors: Ralph Berstecher, Kirchheim; Rainer Palm, Munich, both of Germany

[73] Assignee: Siemens Aktiengesellschaft, Munich, Germany

[21] Appl. No.: 08/803,577

[22] Filed: Feb. 21, 1997

[30] Foreign Application Priority Data

Feb. 21, 1996 [DE] Germany .................... 196 06 480

[51] Int. Cl.$^6$ .................... G05B 13/02; G06G 7/00
[52] U.S. Cl. .................... 364/148; 364/152; 706/14; 706/3; 706/4; 706/8; 395/3
[58] Field of Search .................... 364/148, 152; 395/3; 706/1, 3, 4, 8, 14

[56] References Cited

U.S. PATENT DOCUMENTS

| | | | |
|---|---|---|---|
| 5,241,651 | 8/1993 | Ueda | 364/148 |
| 5,247,432 | 9/1993 | Ueda | 364/148 |

FOREIGN PATENT DOCUMENTS

| | | |
|---|---|---|
| 1240897 | 9/1989 | Japan . |
| WO 93/11473 | 6/1993 | WIPO . |

OTHER PUBLICATIONS

R. Palm et al., "Fuzzy Inputs", Proceedings of the Conference on Fuzzy Systems, Jun. 26, 1994, pp. 756–765.

D.S. Reay, et al., "On the Appropriate Uses of Fuzzy Systems: Fuzzy Sliding Mode Position Control of a Switched Reluctance Motor", Proceedings of the 1995 IEEE International Symposium of Intelligent Control, Aug. 27, 1995, USA, XP000671297, pp. 371–376.

A. Trebi et al., "A Direct Adaptive Fuzzy SMC", Proceedings of the 1995 IEEE International Conference on Fuzzy Systems, XP 000671296, Mar. 20, 1995, pp. 1979–1986.

H. Allamehzadeh et al., "Design and Stability Analysis of a Fuzzy Sliding Mode Controller", Intelligent Engineering Systems Through Artificial Neural Networks, XP 000671299, Nov. 12, 1995, pp. 557–562.

R. Palm, "Robust Control by Fuzzy Sliding Mode", Automatica, vol. 30, No. 9, pp. 1429–1437, 1994.

J. Kahlert, "Fuzzy Control" für Ingenieure.

Primary Examiner—Reba I. Elmore
Assistant Examiner—Navin Natnithithadha
Attorney, Agent, or Firm—Hill & Simpson

[57] ABSTRACT

In a method and arrangement for adapting a sliding mode fuzzy controller to destabilizing changes, control characteristics of the sliding mode fuzzy controller, a closed control loop, are characterized by linguistic variables and are interpreted using linguistic rules in an adaptation block in the control loop which also employs fuzzy control. The rules are configured such that an optimally fast approach of a momentary state condition to the switching line or switching surface of the sliding controller occurs. For adaptation, supporting points are defined in the characteristic of the sliding mode fuzzy controller and these are shifted for the purpose of a desired control behavior, such as by variation of the output fuzzy sets. A separate fuzzy rule set is thus designed for each individual support point.

10 Claims, 4 Drawing Sheets

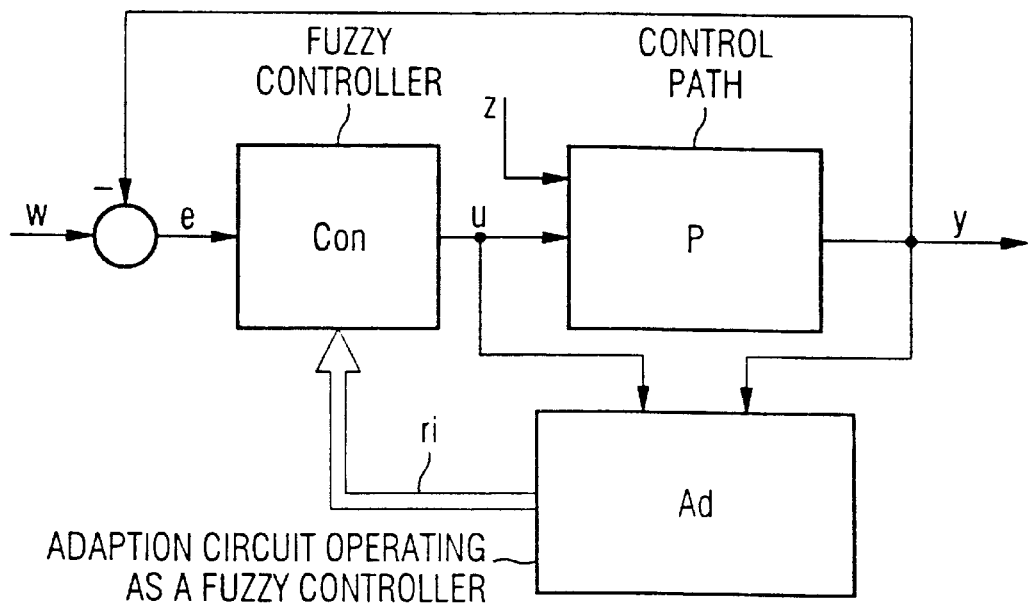
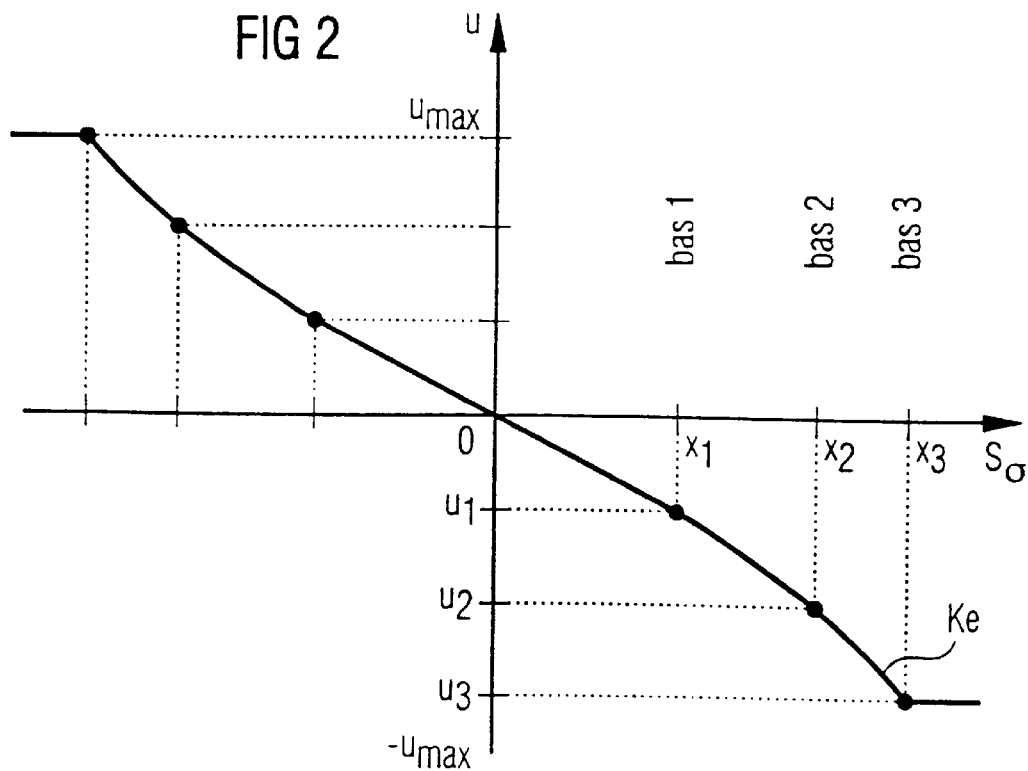

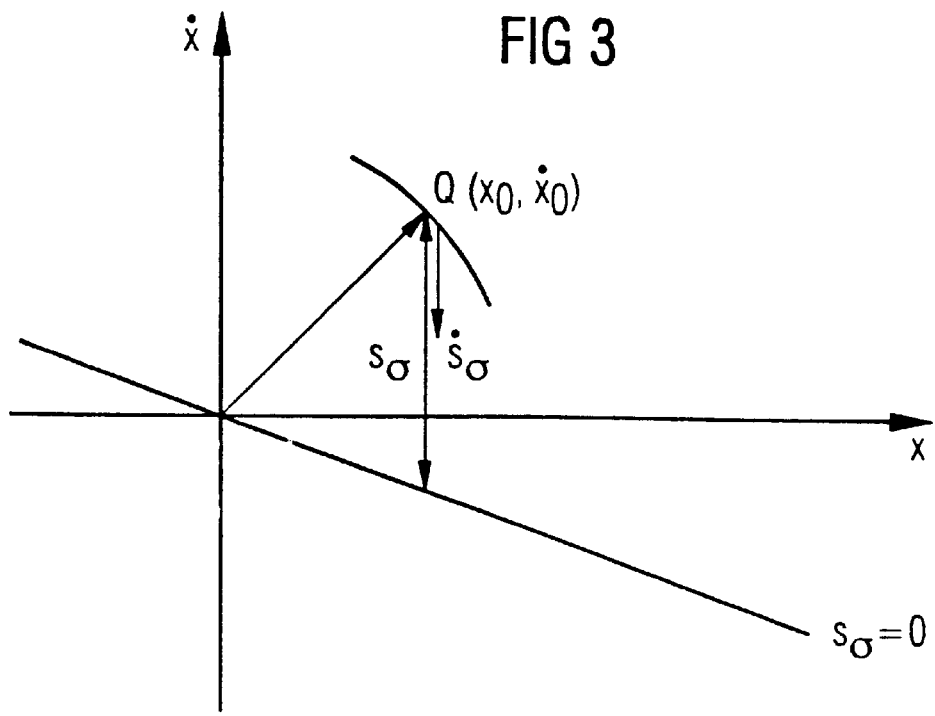

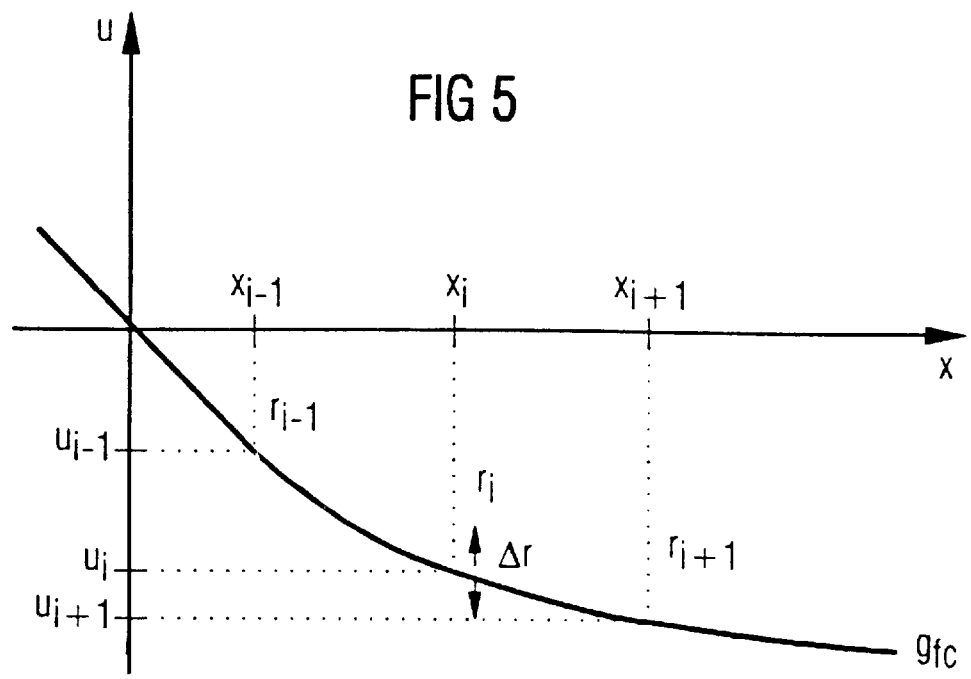
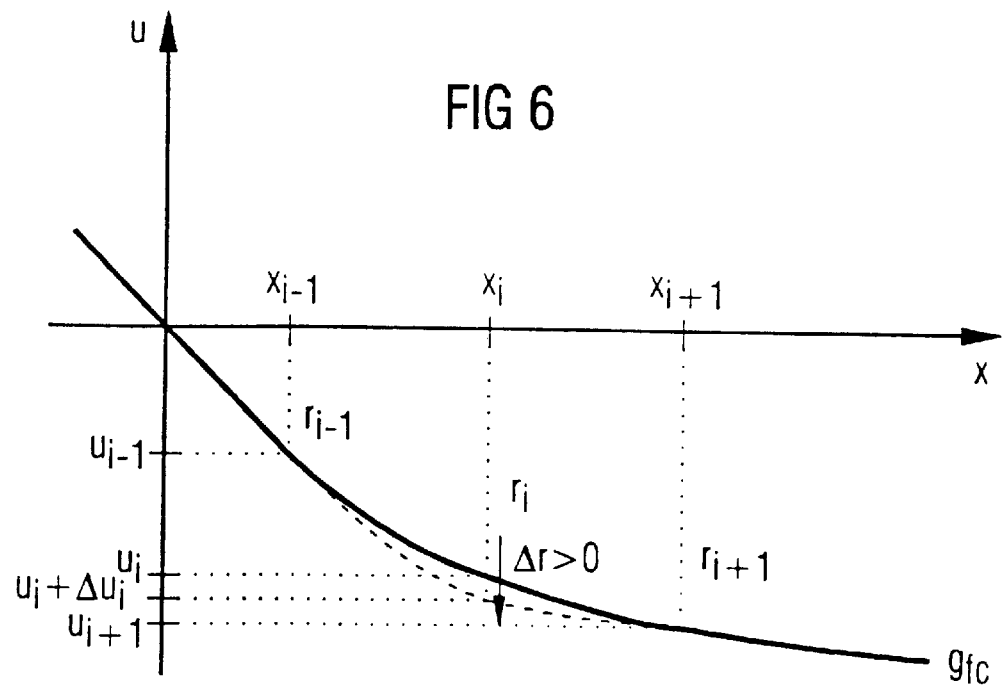

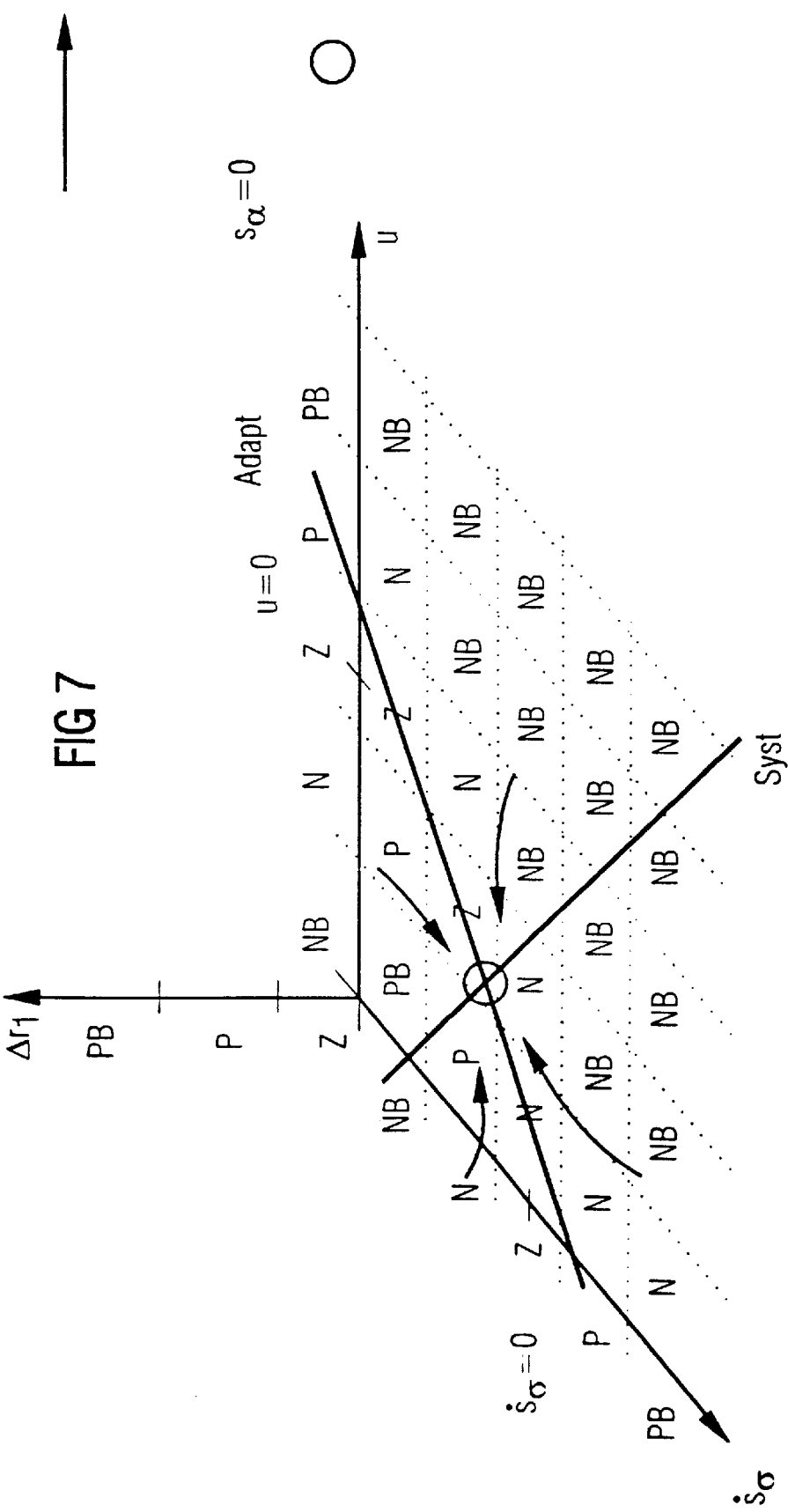

METHOD AND ARRANGEMENT FOR ADAPTING A SLIDING MODE FUZZY CONTROLLER

BACKGROUND OF THE INVENTION

1. Field of the Invention

The present invention is directed to a method and arrangement for adapting a fuzzy controller to different operating points and/or modified system parameters, and in particular to a method and arrangement for adapting a sliding mode fuzzy controller to changes of this type, which represent destabilizing or stability-affecting changes for this type of fuzzy controller.

2. Description of the Prior Art

In complex control-oriented problems, efforts are made to operate controllers in a manner which simulates control strategies of a human expert. Fuzzy controllers have proven especially suitable for such applications because they are simple to program in the form of if-then rules. Since this type of problem formulation approaches the human expert, complex control relationships can also be well-managed with fuzzy controllers. Since fuzzy controllers can also be economically produced on an industrial scale and no complicated mathematical analyses are required for their programming, they have gained entrance into many technical fields of industry. Particularly in the areas of consumer products, more efficient or energy-saving devices can often be built employing fuzzy technology.

The parameters of the system or process to be controlled, and thus of such a fuzzy control system as well, can change dependent on time due to aging or other external influences. Adaptation of the controller with the assistance of an adaptation block is available as a solution for this problem. Various adaptation versions, their advantages and disadvantages, and examples of such adaptation versions have been investigated by the Gesellschaft für Meβ-und Automatisierungstechnik (GMA). They are summarized in the article, "Adaptive Regler, Erläuterungen und Beispiele", VDE/VDE Guideline 3685 dated 1992.

The sliding-mode fuzzy controller represents a special type of fuzzy controller and is distinguished by its special stability properties. The fundamentals and the structure of such a fuzzy controller are disclosed in the PCT Publication WO 93/11 473. These shall be supposed to be known to those of ordinary skill in this field. Such sliding mode fuzzy controllers in diagonal form are equivalent to sliding-mode controllers with a boundary layer. The sliding mode fuzzy controllers can be interpreted by their non-linear transfer characteristic. The balancing of the various possible parameters of such a fuzzy controller for optimum operation is complicated and time-consuming. The adaptation of such a sliding mode fuzzy controllers with a boundary layer to different operating points or modified system parameters (destabilizing stability-affecting changes or system behavior affecting) therefore represents an especially complex problem. The control parameters of sliding mode fuzzy controllers are discussed by R. Palm in the article, "Robust Control by Fuzzy Sliding Mode", in Automatica, pages 1429 through 1437, 1994.

SUMMARY OF THE INVENTION

An object of the present invention is to provide an arrangement and a method with which sliding mode fuzzy controllers can quickly and optimally be adapted to a new operating condition and to changing system parameters.

The above object is achieved in accordance with the principles of the present invention in an apparatus for adapting a sliding mode fuzzy controller to destabilizing changes wherein fuzzy control is employed for adapting the sliding mode fuzzy controller, by using an adaption circuit, connected to a sliding mode fuzzy controller, which operates in a manner of a fuzzy controller to adapt the sliding mode fuzzy controller. In such an arrangement, a method for adapting the sliding mode fuzzy controller includes the steps of modifying the form of the controller characteristic set of the sliding mode fuzzy controller in a closed circuit by determining optimum control parameters in the adaptation block, which operates in the fuzzy sliding mode as well, and, for determining the optimum control parameters, the adaptation block interprets linguistic rules which are applied to linguistic variables that characterize control quantities or control system parameters or control parameters of the sliding mode fuzzy controller, and linguistic rules are used in the adaptation block which generate optimal controller parameters which modify the sliding mode fuzzy controller so as to improve a predetermined quality criterion for the closed control circuit.

As used herein, the term "controller characteristic set" may include as few as one controller characteristic.

A particular advantage of the invented method is that fuzzy control is employed for the first time for the adaptation of a sliding mode fuzzy controller. Simple access to the adaptation problem of the controller is obtained by the interpretation of the control parameters of this controller as linguistic variables and the interpretation of these linguistic variables with linguistic rules. Expertise can be optimally utilized as a result of this inventive procedure.

Linguistic variables of the distance of the actual state point of the control circuit from the switching line, or the normal spacing from the switching surface of the fuzzy controller and of the approach velocity of this momentary state point to the switching line or switching surface, as well as the magnitude of the manipulated variable are preferably employed. Either alone or in optional combination with one another, these quantities present the critical characteristics of the fuzzy controller and thus enable an efficient adaptation, i.e. the adaptation controller can be equipped with a small fuzzy rule set.

As used herein, the term "switching geometry" refers to both the aforementioned switching line and switching surface.

An optimally approach velocity to the switching line or switching surface by the momentary state point of the sliding-mode fuzzy controller given a "reasonable" manipulated variable is preferably selected as quality criterion. A fast adaptation at supporting points and other system parameters is thus enabled.

An approach velocity of the state point to the switching line or switching surface triggered by a specific manipulated variable modification can also be selected as a quality criterion and advantage. Whether a significant change in the value of the approach velocity can be achieved by a corresponding manipulated variable modification can thus also be judged.

Control parameter modifications that affect a high approach velocity given a small change of the manipulated variable are preferred since the controller thus can be especially quickly adapted.

Control parameters that affect a change of the system state of the controller to be adapted dependent on the momentary distance of the state point from the switching line or switching surface of the controller are set by the fuzzy rules in the adaptation. How fast the controller adapts to a new condition, or how stable it operates around the switching line, can thus be controlled. In sliding mode fuzzy controllers, for example, the layer thickness of the boundary layer can serve as an evaluation criterion for the value magnitude of the approach velocity in the boundary layer.

A sliding mode fuzzy controller with a boundary layer can be advantageously used for the adaptation since controllers of this type have a transfer characteristic that can be characterized by supporting points. These supporting points can then be shifted by applying fuzzy rules to the control parameters of the controller. An exactly prescribed transition between positive manipulated variable and negative manipulated variable can thus be achieved within the boundary layer. The number of selected supporting points is preferably selected depending on the available expertise with respect to the adaptation and the desired transition precision within the boundary layer.

The shape of the characteristic can be varied by variation of the position of the support points through which the characteristic must pass. To this end, the output fuzzy sets are preferably selected in the form of an accordion function and the position variation of the supporting points is implemented by expanding (stretching) or compressing the accordion. The variation of the position of the supporting points can also be implemented by a variation of the accordion function of the input fuzzy set of the controller; however, it must be noted that a non-linear relationship between input and output fuzzy sets occurs, and thus the resulting magnitude of the manipulated variable change dependent on the implemented parameter modification cannot be exactly predicted, whereas such an exact prediction is possible in the case of variation of the characteristic via the output fuzzy set.

For variation of the characteristic of the controller to be adapted, the output fuzzy set is therefore varied, so that a proportional relationship exists between the implemented modifications of the control parameters and the manipulated variable. In this way, the adaption speed, i.e. the approach speed of the momentary state point to the switching line, can be especially effectively set.

An arrangement that employs fuzzy control (i.e. an adaptation circuit operating in the manner of a sliding mode fuzzy controller) for adaption of a sliding mode fuzzy controller (so that in effect, one fuzzy controller is being used to adapt another fuzzy controller) is especially advantageous since fuzzy controllers are economic and a complex parameter modification of the controller to be adapted can be more simply described by linguistic rules than is possible with exact mathematical methods.

DESCRIPTION OF THE DRAWINGS

FIG. 1 shows a control circuit to be adapted in accordance with the invention as an example.

FIG. 2 shows a transfer characteristic of a fuzzy controller with supporting points for use in accordance with the invention, as an example.

FIG. 3 illustrates controller characteristics of the controller to be inventively adapted.

FIG. 4 shows an example of fuzzy rules suitable for use in accordance with the invention.

FIG. 5 illustrates an example of the position of supporting points suitable for use in accordance with the invention.

FIG. 6 shows the dependency of a positional change of a support point on a parameter modification used in accordance with the invention.

FIG. 7 shows a three-dimensional diagram for illustrating the complex relationships in the inventive adaptation of a fuzzy controller.

DESCRIPTION OF THE PREFERRED EMBODIMENTS

As an example, FIG. 1 shows a block circuit diagram of a control circuit that is to be inventively adapted and that has a sliding mode fuzzy controller Con. The fuzzy controller Con is arranged in front of a control path in this control circuit. The reference variable input is w, the control difference is e, the manipulated variable is u and the regulating variable is y. The system to be controlled or the process to be controlled is in, or forms, the control path and is referenced P. A disturbance variable z is imposed on the process P. An adaptation method or an adaptation circuit is also provided, this being referenced Ad. The illustration of the adaptation circuit Ad or of the adaptation method in a block, however, is not intended to mean that the inventive method or the inventive arrangement can only be realized as a single, unified component. Portions of the inventive method can be externally performed and other portions can be performed with the confines of the components of FIG. 1. As can be further perceived, the manipulated variable u and the regulating variable y are supplied to the adaptation method or the adaption circuit Ad, however, embodiments of the invention are also conceivable wherein only one of these quantities or, on a case-by-case basis, an additional quantity, plays a part. What is of particular concern in the inventive method and in the inventive arrangement is that linguistic variables are formed from the manipulated variable u and from the regulating variable y, these linguistic variables being processed in the adaptation block Ad by means of linguistic rules. This processing leads to control parameters $r_i$ that are supplied to the sliding mode fuzzy controller Con in order to adapt it.

In general, an input variable is supplied to the sliding mode fuzzy controller Con as a physical quantity; this is first fuzzified via input fuzzy sets. The membership functions of the input and output functions of the controller Con are preferably linear in portions thereof. Functions are preferably employed that are fashioned so that at every location of the input and output region, at most two neighboring membership functions exhibit membership values $\mu_i$ unequal to zero. The sum of the values of the membership functions is 1 at every point. Membership functions of this type are also referred to as accordion functions. A value pair composed of a linguistic value of the linguistic variables and the associated degree of truth is allocated to a physical quantity by the fuzzy controller. The different input values of the input variables obtained in this way are operated on by rules in a rule base. The set of output values is determined after processing the rules by modifying the membership function of the output fuzzy set with the rule results. The crisp output value is preferably but not necessarily determined using the center of gravity method. Those points of the fuzzy set which have a membership grade of 1 are called supporting points. Only one rule preferably "hits" at such points. This results in the non-linear transfer characteristics of the sliding mode fuzzy controller proceeding through these points. The interpolation property of the fuzzy controller thus results in a non-linear interpolation between these supporting points. The form of the interpolation is preferably dependent on the aggregation property and on the defuzzification method.

Fuzzy controllers can be interpreted as a static non-linearity. In addition depending on the values of the rule base, the curve of the characteristic depends on the selected membership functions of the input and output variables as well as on the defuzzification method. A characteristic or a characteristic surface of the fuzzy controller is defined by the heuristic knowledge or the experimental knowledge that is stored in the fuzzy rules and the dependency of the manipulated variable on the input quantity and the parameters $r_i$ of the parameter vector to be determined for the fuzzy controller.

When the membership functions of the input variables of the fuzzy controller thereby supplement one another to 1 at every location of the definition region, whereby at most two neighboring membership functions have membership values differing from 0, then the point at which only one rule of the rule base is fulfilled is referred to as a supporting point.

An adaptive control system is a control system in which adjustable properties automatically adjust (VDI/VDE) to variable or unknown process properties in the sense of a quality criterion. As a result of the inventive method, for example, the characteristic of the sliding mode fuzzy controller, or the characteristic surface of a fuzzy controller, is to be adapted. In particular, the characteristic within the boundary layer is adapted for that of a fuzzy sliding mode controller. The adaptation strategy is thereby determined by linguistically defined rule bases. These rules determine how the individual parameters of the controller are to be adjusted in order to achieve the desired behavior in the closed control circuit. The behavior of the closed control circuit is preferably utilized for the adjustment of the controller Con. By contrast to tuning or fine tuning of the controller Con, adaption represents a continuous adaptation to changing environmental conditions. In addition to the interpolation and approximation property of fuzzy controllers, the possibility of being able to locally modify the static transfer characteristic of the fuzzy controller is especially significant. Linear or non-linear relationships play a part dependent on the parameters of the fuzzy controller that are adaptively adjusted. When, for example, the parameter vector r is linearly linked with the output quantity u of the controller Con, then the relationship can be presented in a simple way. It is preferably assumed in the implementation of the inventive method for adaptation that the manipulated variable of the fuzzy controller is big enough to be able to drive the system condition from an arbitrary initial condition onto the switch surface and to maintain the system trajectory remaining in the boundary layer around the switching surface.

Preferably, the curve of the transfer characteristic of a sliding mode fuzzy controller is to be adapted within the boundary layer with the inventive method. To this end, the output values of the fuzzy controller are preferably influenced at the supporting points with the inventive method.

FIG. 2 shows such a characteristic as an example in combination with six supporting points. The characteristic is referenced Ke and in this example is symmetrical relative to the origin. For $s_\sigma > 0$, the individual supporting points are at the locations $(0,0)$, $(x_1, u_1)$, $(x_2, u_2)$, $(x_3, u_3)$. Since here the characteristic is symmetrical but not necessarily relative to the origin, supporting points are likewise located at the corresponding coordinate points for negative x and positive u. With such a procedure, symmetry properties of the system or process to be controlled can be advantageously exploited in order to keep the number of fuzzy controllers to be adapted as small as possible. These supporting points of the characteristic surface or of the characteristics of the fuzzy controller are the points at which the value of the fuzzy controller can be directly recited, i.e. without interpolation. The parameters of the fuzzy controller to be adapted are preferably combined in the parameter vector r, with $r=(r_1, \ldots, r_i, \ldots, r_n)^T$. In order to obtain a linear adaptation problem in the adaption parameters $r_i$, the initial value of the fuzzy controller is preferably adapted by the moments $M_i$ at the support points. The moments of the membership functions are calculated from equation (1):

$$u = g_{fc} = g_{fc}(x \cdot r) = \frac{\sum_{i=1}^{N} M_i \mu_i}{\sum_{i=1}^{N} A_i \mu_i} \tag{1}$$

The moments are listed as $M_i$, the surface of a rule with $i, \mu$ indicating the degree of truth thereof. The heuristic knowledge or the experimental knowledge is stored in N rules. The designation $g_{fc}$ represents the characteristics or the transfer characteristic of the fuzzy controller, whereas $g_{fc}(x, r)$ identifies the dependency of the manipulated variable u on the input quantity x and the parameters $r_i$ yet to be determined. The index i indicates the $i^{th}$ supporting point, whereas the index fix (used below) indicates that the variable indexed therewith is retained. According to equation (2), the switch variable $s_{\sigma,i}$ can be calculated for $x=x_{fix,i}$ at the $i^{th}$ support point.

$$s_\sigma = s_{\sigma_i} = \left(\lambda_R + \frac{d}{dt}\right)^{(n-1)} e = \sum_{i=0}^{n-1} \binom{n-1}{i} \lambda_R^i e^{(n-1-i)} \tag{2}$$

If the moments $M_i$ of the controller are influenced, the adaptation strategy preferably guarantees a prescribable behavior of the closed control circuit that is defined for various locations of the condition space $x_{fix,i}$. Preferably one rule base is produced for the adaptation for each supporting point value that is to be adapted. Exactly one parameter value $r_i$ that characterizes the height (magnitude) $u_i$ of the support point is allocated to each supporting point i at the location $x_{fix,i}$. The value $u_i$ of the fuzzy controller at the supporting point is thus defined. With the inventive method for adaption, this value $u_i$ of the fuzzy controller at the supporting point $x_{fix,i}$ is influenced dependent on the behavior of the closed control circuit. The adaption process is preferably made dependent on the quantities "distance" $s_\sigma$ of $Q(x_0)$ to the switch line $s_\sigma = 0$ according to Equation (5) for $x_{fix,i}$, approach speed $\dot{s}_\sigma$ of $Q(x_0)$ to the switch line $s_\sigma = 0$, and manipulated variable U.

As FIG. 3 shows, the corresponding quantities Q, $s_\sigma$ and $\dot{s}_\sigma$ are shown in their dependencies on one another. Also in FIG. 3, the quantities x and $\dot{x}$ have also been referred to as the control difference in the description of the control circuit of an operating point in the origin of the phase plane. These two quantities are to be considered equivalent. Conclusions about a parameter modification $\Delta r_i$ of the parameter vector r are drawn from these illustrated quantities, preferably in combination with the manipulated variable. The objective in the inventive procedure is to achieve an optimal approach to the switching line $s_\sigma = 0$. A too slow approach velocity to the switching line should preferably be avoided. On the other hand, an approach velocity too high to the switching line $s_\sigma = 0$ should be avoided given small distances $s_\sigma$ since this can lead to an undesired overshooting of the controller. When, for example, $s_\sigma$ is positive big, $\dot{s}_\sigma$ negative and u negative, then, for example, the negative output value u of the controller should not be varied. This is achieved in that $\Delta r_i = Z$ (zero) is set. This is illustrated in the table by rule 7.

$R_i^j$: If $s_\alpha$ is $LS_{\alpha i}^j$ and u is $LU_i^j$ then $\Delta R_i$ is $LAR_i^j$

| | | | | |
|---|---|---|---|---|
| Rule 1: | PB | NB | NB | PB |
| Rule 2: | PB | N  | NB | P  |
| Rule 3: | PB | Z  | NB | Z  |
| Rule 4: | PB | P  | NB | N  |
| Rule 5: | PB | PB | NB | NB |
| Rule 6: | PB | NB | N  | P  |
| Rule 7: | PB | N  | N  | Z  |
| Rule 8: | PB | Z  | N  | N  |
| Rule 9: | PB | P  | N  | NB |

Here, P stands for positive, N for negative, Z for zero (null) and B for big.

These adaptation rules are preferably derived by experience or by heuristic knowledge. One skilled operator knows from general experience in the field of fuzzy control that the approach speed $\dot{s}_\alpha$ should be relatively high given a large excursion and negative u. When, further, for example, $s_\alpha$ is positive big, $\dot{s}_\alpha$ positive and u is negative, then the manipulated variable of the controller is not big enough in order to effect $\dot{s}_\alpha<0$, i.e. the negative output value of the fuzzy controller is greatly diminished more by $\Delta r_i<0$. This is graphically shown in Table 1 by Rule 9.

The designation $s_\alpha$ identifies the distance from the switching line of the fuzzy controller with $s_\alpha=0$. The designation Q is the point on the system trajectory with the coordinates $(x_{0,0})$. The designation $\dot{s}_\alpha$ characterizes the approach of the system point Q to the switching line $s_\alpha=0$. As a result of the inventive method, the quantities' location, as the distance $s_\alpha$ from the switching line, are connected with the approach speed, as the derivative $\dot{s}_\alpha$, and the manipulated variable u to be exerted, directly correlated with the manipulation energy. The basic goal in the inventive adaptation strategy is to achieve an optimally fast approach to the switching line. Given sliding mode fuzzy controllers, too slow an approach velocity in the boundary layer to the switching line $s_\alpha=0$ should be avoided in order to be able to quickly reject disturbances. Too high an approach velocity given small excursions, however, can result in an undesirable overshooting of the control circuit. The L rules $R^j_i$, which determine the preferred adaptation strategy for the parameters $r_i$ at the supporting point $x_{fix,i}$ preferably exhibit the following form:

$R_i^j$: If $s_\alpha$ is $LS_{\alpha i}^j$ and $\dot{s}_\alpha$ is $L\dot{S}_{\alpha i}^j$ and u is $LU_i^j$ Then $\Delta R_i$ is $LAR_i^j$=1,...,L The rules for the supporting point that are characterized by "$s_\alpha$ is PB" are summarized in Table 1. The fuzzy rules from Table 1 are likewise shown as a matrix in FIG. 4. It can be seen therein that the rule sets exhibit a diagonal form, this being shown with the dotted boundaries. The distance $s_\alpha$ of the condition vector x from the switching surface $s_\alpha=0$ is linked by these rules with the derivative $\dot{s}_\alpha$, which the manipulated variable u also influences, and with the manipulated variable in the premise of the rule $R^j_i$. The component $r_i$ of the parameter vector R is preferably varied with $\Delta r_i$ in the conclusion part of the same rule. $LS^j_{\alpha i}$, $L\dot{S}^j_{\alpha i}$, $Lu^j_i$ and $LAR^j_i$ represent the value set of the corresponding linguistic variables. Preferably, the switching variable $S_\alpha$ is determined according to Equation (5) and characterizes the position of the supporting point in the controller characteristic. Let $S_\alpha$ be assumed for present purposes to be a constant for the rules of the $i^{th}$ rule base that adapt the value of the fuzzy controller at the $i^{th}$ supporting point.

FIG. 5 illustrates the relationship in the variation of the position of a supporting point due to a parameter change $\Delta r$. Various support points are indicated in the controller characteristic $g_{fc}$ as intersections on the coordinates of the respective x- and u-values. The change $\Delta r$ at the supporting point at the point $x_i$ and $u_i$ is indicated in the form of two arrows. The modification of the position of the support point should be implemented only in the direction of the u axis. The reason for this is that a linear relationship exists only between u and $\Delta r$, as was set forth earlier. In order to be able to carry out such a modification, the accordion function of the output fuzzy set must be compressed or stretched. It is also conceivable to implement a modification of the position of the support points in the x-direction, however, if this is done it must be taken into account that no proportional or, linear relationship can be found between the change in the x-direction and the parameter modification, since there is no linear relationship between the input fuzzy sets and the output quantity. If such a linear relationship is of no significance in the adaptation of the controller, then a modification of the position of the supporting points in the x-direction could be achieved by a compression or stretching of the accordion functions of the input fuzzy sets.

The goal of the invention is a designational influencing of the control parameters $r_i$. This procedure represents a fundamental of the inventive adaptation method. The parameter values $r_i$ themselves directly influence the fuzzy controller $g_{fc}(.)$—this indicates the momentary condition vector—and, thus, also directly influence the derivative $\dot{s}_\alpha$. Dependent on the desired behavior of the closed control circuit at the supporting points, the rules thereby determine the corresponding modification of the parameters $r_i$ of the fuzzy controller. A separate rule base and, thus, adaptation strategy is preferably defined for the adaptation of each parameter $r_i$. Couplings between the various parameters are avoided by the influencing of the parameters $r_i$ of the fuzzy controller at the supporting points ($\mu_i=1$). It can also be seen from the illustration of the situation in FIG. 5 that a modification of the controller parameters $r_j$, $j\neq i$, never modifies the output value of the fuzzy controller at the supporting point $r_i$. The similarity of the inventive method to the structure of a fuzzy sliding mode controller becomes clear from Table 1. The structure of a sliding mode fuzzy controller is present for this rule base because the same output values $\Delta r_i$ as were shown in FIG. 4 reside in the parallels to the main diagonal. Here, however, the fuzzy sliding mode controller is utilized for the adaption purposes of a second sliding mode fuzzy controller in the underlying control circuit. In this case, the switching surface of fuzzy mode sliding controllers is reduced to a switch line $s_\alpha=0$ in the ($\dot{s}_\alpha$, u)-plane.

This situation is shown graphically in FIG. 7. The switching line is thereby referenced "Adapt". This switch line can be analytically described as $$s_\alpha = s_\alpha(\dot{s}_\alpha, u) = \lambda_\alpha(\dot{s}_\alpha - \dot{s}_{\alpha,0}) + (u-u_0) = 0$$

wherein $\lambda_\alpha>0$ indicates the slope of the adaption line $s_\alpha=0$. The point $(\dot{s}_{\alpha,0}, u_0)$ defines a point on the adaption line. The system line thereby illustrates the system behavior in the ($\dot{s}_\alpha$, u)-plane. The respective linguistic variables are entered in the individual raster surfaces of the plane ($\dot{s}_\alpha$, u) S these are the values that $\Delta r_i$ preferably assumes when the momentary condition ($_\alpha\dot{s}$, u) is located in this raster field. As a result of the specified parameter changes $\Delta r$, an approach of the illustrated system condition is achieved in the direction of the intersection of the two lines Adapt and Syst. The linguistic variables are referenced in a standard way. NB denotes negative big, N denotes negative, P denotes positive, PB denotes positive big, Z denotes zero. One preferably proceeds according to the following adaption laws for the adaption of the fuzzy sliding mode controller.

The basis for the control and the adaption is preferably the system equation $$x^{(n)} = f(\vec{x}) + b(\vec{x}) \cdot u \qquad (3)$$

wherein $\vec{x} = (x, \dot{x}, \ldots, x^{(n-1)})^T$ designates the static vector;

$b(\vec{x}) > 0$, $f(\vec{x})$ designates non-linear functions of $\vec{x}$;

u designates the manipulated variable; and $x^{(n)}$ designates the $n^{th}$ the derivative of x.

The adaptation law for the controller that produces the manipulated variable u is preferably $$\dot{r}_i = -\frac{1}{\lambda_\alpha \hat{b}(\vec{x})_{fix,i} + 1} c_{ii} \frac{\partial g_{fc}(\vec{x}_{fix,i}, \vec{r})}{\partial r_i} \cdot sgn(s_\alpha) \qquad (4)$$

This indicates how the parameter adaptation rate $\dot{r}_i$ is to be selected for the parameter $r_i$ so that the adaptation converges, wherein.

$\lambda_\alpha$ determines the steepness of the adaption line $s_\alpha = 0$.;.

$\hat{b}(x_{fix,i})$ is an estimate for the function $\beta(x_{fix,i})$ at the point $x_{fix,i}$;

$c_{ii} > 0$ is thereby the ii-element from and (N×N) diagonal matrix in which only the diagonal is occupied;

$$\frac{\partial g_{fc}(\vec{x}_{fix,i}, \vec{r})}{\partial r_i}$$

is the variation of the control law $du = dg_{fc}(\vec{X}_{fix,i}, \vec{r})$ with respect to the parameter change $dr_i$; and sgn ($s_\alpha$) determines the operational sign of the parameter change rate to be selected.

The equilibrium condition $$\lambda_\alpha(\Delta f(\vec{x}) + \Delta b(\vec{x}) g_{fc}(\vec{x}, \vec{r})) + (\lambda_\alpha b(\vec{x}_{fix,i}) + 1) \cdot (g_{fc}(\vec{x}_{fix,i}, \vec{r}) - g_{fc}(\vec{x}_{fix,i}, \vec{r}_{opt})) = 0 \qquad (5)$$

describes the system behavior on the adaption line $s_\alpha = 0$. It places system imprecisions [please enter notation from p. 16, I.16] in conjunction with deviations of the $i^{th}$ parameter component $r_i$ from its optimum value. Dependent on the level of system imprecisions, a value deviating from the optimum controller $u = g_{fc}(\vec{x}_{fix,i}, \vec{r}_{opt})$ arises for the adapted controller $u = g_{fc}(\vec{x}_{fix,i}, \vec{r})$ at the location $x_{fix,i}$, this value converging onto the optimum value during the course of the adaption for $$\Delta f(\vec{x}) + \Delta b(\vec{x}) g_{fc}(\vec{x}, \vec{r}) \to 0.$$

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for adapting a sliding mode fuzzy controller, comprising the steps of:
   a) modifying a form of a controller characteristic set of a sliding mode fuzzy controller in a closed control circuit determining optimum control parameters in an adaptation block operating the fuzzy sliding mode;
   b) for determining the optimum control parameters, interpreting linguistic rules that are applied to linguistic variables that characterize at least one of the control quantities and derivatives of control quantities and at least one of the controller parameters and derivatives of controller parameters of the sliding mode fuzzy controller; and
   c) using linguistic rules in the adaptation block which generate optimal controller parameters which modify said sliding mode fuzzy controller to improve a predetermined quality criterion for the closed control circuit.

2. A method as claimed in claim 1 wherein said sliding mode fuzzy controller has a control path formed by a plurality of state points and wherein said sliding mode fuzzy controller has a switching geometry, and wherein said sliding mode fuzzy controller has a manipulated variable associated therewith, and wherein step (b) comprises selecting said at least one of control quantities and derivatives of control quantities from the group consisting of a distance of a momentary state point of said control path from said switching geometry, and approach velocity of a momentary state point of said control path to said switch geometry, a combination of the distance and the approach velocity of a momentary state point of the control path relative to said switching geometry, and a manipulated variable.

3. A method as claimed in claim 2 wherein step (c) is further defined by selecting said predetermined quality criterion to be an optimally fast approach of said momentary state point to said switching geometry.

4. A method as claimed in claim 2 wherein step (c) is further defined by selecting said predetermined quality criterion to be a modification of said manipulated variable referenced to said approach velocity of said momentary state point to said switch geometry.

5. A method as claimed in claim 4 comprising selecting said at least one of controller parameters and derivatives of controller parameters which produce a high approach velocity of said momentary state point to said switching geometry with a small modification of said manipulated variable.

6. A method as claimed in claim 2 wherein step (b) is further defined by selecting said at least one of controller parameters and derivatives of controller parameters which produce a proportional dependency of said approach velocity of said momentary state point to said switch geometry on the distance of said momentary state point from said switching geometry.

7. A method as claimed in claim 1 wherein said characteristic set has supporting points associated therewith, and wherein step (a) is further defined by modifying said characteristic set by varying respective positions of said support points.

8. A method as claimed in claim 7 wherein said sliding mode fuzzy controller has fuzzy sets associated therewith, and wherein the step of varying the position of said support points comprises modifying said fuzzy sets.

9. A method as claimed in claim 8 wherein said fuzzy sets include output fuzzy sets, and wherein the step of varying the position of said support points comprises varying said output fuzzy sets.

10. An arrangement for adapting a sliding mode fuzzy controller to destabilizing changes comprising:
    a closed control circuit containing a sliding mode fuzzy controller
    subjected to destabilizing changes, said sliding mode fuzzy controller having a controller characteristic set associated therewith; and adaptation block means, connected to said sliding mode fuzzy controller
in a closed control loop, for operating in a fuzzy sliding mode for modifying said controller characteristic set of said sliding mode fuzzy controller to adapt said sliding mode fuzzy controller to said destabilizing changes.

* * * * *